United States Patent Office 2,724,722
Patented Nov. 22, 1955

2,724,722

PROCESS FOR THE PRODUCTION OF α-(O-AMINO-ARYLOXY)-FATTY ACIDS OR THEIR SALTS

Werner Bossard, Riehen, near Basel, and Andreas Gygax, Basel, Switzerland, assignors to J. R. Geigy A. G., Basel, Switzerland, a Swiss firm No Drawing. Application January 21, 1952,
Serial No. 267,503

Claims priority, application Switzerland February 2, 1951

8 Claims. (Cl. 260—519)

The present invention concerns a new process for the production of α-(o-aminoaryloxy)-fatty acids or their salts, some of which are new and others are already known. They are valuable intermediate products for the production of metallisable azo dyestuffs.

Up to the present, o-aminoaryl glycolic acids or their salts have been produced either from o-nitrophenols or -naphthols by reacting with chloracetic acid and reducing the nitro group to the amino group, or from aromatic o-hydroxyamino compounds by chloracetylation of the amino group and closure of the ring with alkalies under mild conditions to form the lactam of the corresponding o-aminoaryl glycolic acids and then saponification of the latter wih strong alkalies. As a result of the bad condensability of the o-nitrophenols or -napthhols, the first process requires considerable excesses of chloracetic acid. It is, therefore, expensive and often produces unsatisfactory yields. The second process requires o-aminohydroxyaryl compounds as starting materials which are generally very sensitive to oxidation and which in many cases produce impure end products because of dark coloured oxidation products which are difficult to remove. In addition in certain cases, the starting material is not easily available technically as for example, in the diphenyl series.

The present process uses o-alkoxyarylamides of lower molecular α-halogen fatty acids as starting materials. They are obtained from the technically easily accessible o-alkoxyaminoaryl compounds which are quite stable to oxidation and can be easily produced in a very pure form with the help of α-halogen fatty acid halides.

It has been found that the action of Friedel-Crafts catalysts on o-alkoxyarylamides of lower molecular α-halogen fatty acids at a raised temperature by splitting off the alkyl radical of the alkoxy group in the form of alkyl halide, closes the ring and lactams or lactam-like intermediate steps of the corresponding α-(o-aminoaryloxy)-fatty acids which often still contain halogen are formed. These can easily be converted into the alkali salts of α-(o-aminoaryloxy)-fatty acids by reaction with strong alkalies. These alkali salts are produced in a pure form and can easily be converted into non-halogen-containing lactams, some of which are known, by the action of mineral acids. They are very suitable for identification and analysis of the compounds according to the present invention. It is surprising that generally good yields are obtained from this new condensation reaction without any disturbing side reactions such as for example alkylations, occurring to any great extent.

O-alkoxyarylamides of lower molecular α-chloro- and α-bromo-fatty acids can be used according to the present invention, preferably those of chloro- and bromacetic acid. Chiefly, lower molecular alkyl radicals such as methyl and ethyl constitute the alkyl radicals in the alkoxy groups. The aromatic o-alkoxy-α-halogen-acylamino compounds which can be employed according to the invention can be derived for example from o-alkoxyaminobenzene-, o-alkoxyaminodiphenyl- and o-alkoxyamino- naphthalene compounds, the aromatic rings of which may be further substituted by substituents stable under the reaction conditions such as e. g. halogen, alkyl, alkylsulphonyl, sulphonic acid amide groups, etc. or by substituents which change under the reaction conditions such as e. g. further alkoxy groups.

The Friedel-Crafts catalysts are reacted either in the melt, advantageously in the presence of additives lowering the melting point such as alkali metal halides, and/or tertiary bases such as pyridine, trialkylamines, etc. or in inert organic solvents or diluents. Hydrocarbons such as toluene or xylene, and hydrocarbons having nitro groups or halogen groups such as nitrobenzene, chlorobenzene, polyhalogen benzene, tetrachlorethane can be employed as indifferent organic solvents and diluents. The reaction temperature depends on the activity of the catalyst used and in general is over 60° C. Of the known metal halides which can be used as Friedel-Crafts catalysts, there may be named ferric chloride, aluminum chloride and aluminum bromide, the second being preferred because of its easy technical accessibility and its high activity.

Starting from the technically easily available 3.3′-dimethoxy-4.4′-diaminodiphenyl, the process according to the present invention enables the production of 4.4′-diaminodiphenyl-3.3′-diglycolic acid which is very valuable as a dyestuff intermediate product. Not only has the process only three steps but also very good yields are obtained.

The following examples illustrate the invention without limiting it in any way. Parts are given as parts by weight and the temperatures are in degrees centigrade.

Example 1

199.5 parts of (2-chloracetylamino)-1-methoxybenzene (obtained by reacting 2-amino-1-methoxybenzene with chloracetyl chloride in chlorobenzene; B. P.$_{12}$ 178°) are added at 120–130° to a melt of 1600 parts of dehydrated aluminum chloride and 400 parts of sodium chloride whereby methyl chloride and hydrogen chloride are given off. On completion of the reaction, the melt is poured on to 8000 parts of ice and 500 parts of conc. hydrochloric acid, the difficultly soluble reaction product is filtered off and washed with cold water. Saponification of the raw product by heating with 20% caustic soda lye produces the sodium salt of 2-aminophenyl-1-glycolic acid which can be isolated in a yield of 70% of the theoretical by salting out with sodium chloride.

By warming the sodium salt with excess diluted hydrochloric acid, the known lactam of 2-aminophenyl-1-glycolic acid of the formula

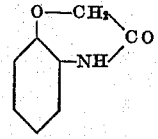

is obtained. M. P. 173°.

If 400 parts of potassium chloride or 145 parts of triethylamine are used instead of 400 parts of sodium chloride as diluent, the same compound is obtained.

Example 2

137 parts of 4-methyl-2-amino-1-methoxybenzene are dissolved at 100° in 1400 parts of dry nitrobenzene, 120 parts of chloracetyl chloride are added to the solution and the whole is stirred at 100° until no more hydrogen chloride is developed. (M. P. of a sample 80°.)

400 parts of pulverised dehydrated aluminum chloride are added at 20° to the nitrobenzene solution and the mixture is slowly heated to 110° whereby methyl chloride and hydrogen chloride are given off. On completion of the reaction, the mixture is poured on to 5000 parts of ice and 420 parts of concentrated hydrochloric acid and the nitrobenzene is evaporated off with steam.

The difficultly soluble reaction product which remains is filtered off and washed with water. It is saponified by heating with 15% caustic soda lye to form the sodium salt of 4-methyl-2-aminophenyl-1-glycolic acid which can be isolated by salting out. Yield: 70% of the theoretical.

By heating with excess aqueous hydrochloric acid the sodium salt is converted into the lactam of 4-methyl-2-amino-phenyl-1-glycolic acid of the formula:

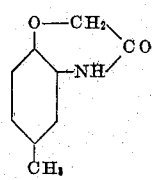

Recrystallised from ethanol it is obtained in the form of white needles. M. P. 209°.

Calculated: C 66.26%, H 5.56%, N 8.59%. Found: C 66.21%, H 5.50%, N 8.53%.

The same product is obtained if 1800 parts of xylene, 1600 parts of chlorobenzene, 1800 parts of o-dichlorobenzene, 1800 parts of trichlorobenzene or 1800 parts of tetrachlorethane are used as indifferent solvent instead of 1400 parts of nitrobenzene.

If instead of 137 parts of 4-methyl-2-amino-1-methoxybenzene, 168 parts of 5-nitro-2-amino-1-methoxybenzene are used the lactam of 5-nitro-2-aminophenyl-1-glycolic acid of the formula:

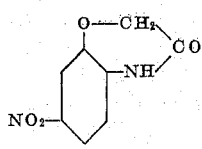

is obtained. The compound crystallises from ethanol in the form of yellow needles. M. P. 233°.

Calculated: C 49.48%, H 3.12%, N 14.44%. Found: C 49.58%, H 3.07%, N 14.46%.

Example 3

234 parts of 4-chloro-2-(chloracetylamino)-1-methoxybenzene (obtained by reacting 4-chloro-2-amino-1-methoxybenzene with chloracetyl chloride in chlorobenzene, M. P. 101°) are added at 120–130° to a melt of 2000 parts of dehydrated aluminium chloride and 500 parts of sodium chloride whereby methyl chloride and hydrogen chloride are given off. When no more methyl chloride is developed, the melt is poured on to 7000 parts of ice and 650 parts of concentrated hydrochloric acid. The difficultly soluble reaction product is filtered off, washed with cold water and saponified by heating with 15% caustic soda lye to the sodium salt of 4-chloro-2-aminophenyl-1-glycolic acid. Yield 90% of the theoretical.

It is converted into the lactam of 4-chloro-2-aminophenyl-1-glycolic acid of the formula:

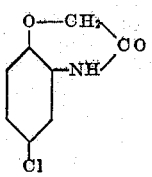

by heating with excess hydrochloric acid, which lactam recrystallises from ethanol in small white needles. M. P. 215°.

Calculated: C 52.33%, H 3.30%, N 7.63%, Cl 19.31%. Found: C 52.47%, H 3.10%, N 7.45%, Cl 19.39%.

Example 4

278.5 parts of 4-sulphamido-2-(chloracetylamino)-1-methoxybenzene (obtained by reacting 4-sulphamido-2-amino-1-methoxybenzene with chloracetyl chloride in nitrobenzene, M. P. 169°) are added at 130° to a melt of 3200 parts of dehydrated aluminium chloride and 800 parts of sodium chloride whereby methyl chloride and hydrogen chloride are given off. When no more gas is developed, the melt is stirred with 15,000 parts of ice and 1000 parts of concentrated hydrochloric acid. The precipitated reaction product is filtered off and washed with cold water.

This reaction product crystallises from hot water in white needles, M. P. 201°. According to microanalysis it is the product of addition of 1 mol of hydrogen chloride to 1 mol of the lactam of 4-sulphamido-2-aminophenyl-1-glycolic acid. Its composition is $C_8H_9N_2O_4SCl$.

Calculated: N 10.58%, Cl 13.40%, S 12.11%. Found: N 10.52%, Cl 13.26%, S 12.12%.

The raw product is dissolved in 12,000 parts of water at 95°, 15 parts of animal charcoal are added to the solution, it is clarified and the hot filtrate is neutralised with 60 parts of 25% ammonia. On cooling, the lactam of 4-sulphamido-2-aminophenyl-1-glycolic acid of the formula:

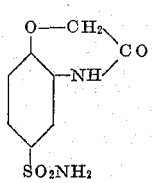

crystallises out in the form of white needles. The yield is about 60% of the theoretical.

The recrystallised compound melts at 248°.

Calculated: C 42.10%, H 3.53%, N 12.29%. Found: C 42.33%, H 3.50%, N 12.24%.

The sodium salt of 4-sulphamido-2-amino-1-phenyl-glycolic acid is obtained by saponification with 15% caustic soda lye.

Example 5

229.5 parts of 1.4-dimethoxy-2-(chloracetylamino)-benzene (obtained by reacting 1.4-dimethoxy-2-aminobenzene with chloracetyl chloride in chlorobenzene, M. P. 79°) are added at 120–130° to a melt of 2400 parts of dehydrated aluminum chloride and 600 parts of sodium chloride whereby methyl chloride and hydrogen chloride are given off. When no more gas is developed, the melt is stirred with 12,000 parts of ice and 900 parts of concentrated hydrochloric acid. The difficultly soluble reaction product is filtered off and washed with cold water. The product crystallises from hot water in white needles, M. P. 190°. According to microanalysis it is the product of addition of 1 mol of hydrogen chloride to 1 mol of the lactam of 4-hydroxy-2-aminophenyl-1-glycolic acid. Its composition is $C_8H_8NO_4Cl$.

Calculated: N 6.95%, Cl 17.59%, OCH₃ 0%. Found: N 6.78%, Cl 17.55%, OCH₃ 0%.

The raw product is dissolved in 10,000 parts of water at 95°, it is clarified and the hot filtrate is neutralised with 55 parts of 25% ammonia. On cooling, the lactam of 4-hydroxy-2-aminophenyl-1-glycolic acid of the formula:

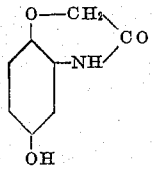

crystallises out in the form of white needles. The yield is about 55% of the theoretical.

The recrystallised compound melts at 253° on decomposition.

Calculated: C 58.18%, H 4.27%, N 8.48%. Found: C 58.15%, H 4.29%, N 8.50%.

Example 6

244 parts of 4.4'-diamino-3.3'-dimethoxydiphenyl are dissolved hot in 1600 parts of dry chlorobenzene. 239 parts of chloracetyl chloride are added at 100° within 2 hours and the whole is kept at this temperature until no more hydrogen chloride is given off. The mixture is then cooled to room temperature whereupon part of the 4.4'-di-(chloracetylamino) - 3.3' - dimethoxydiphenyl precipitates as crystals. M. P. 222°.

400 parts of pulverised dehydrated aluminum chloride are added to the above mixture whereupon hydrogen chloride and methyl chloride are soon vigorously generated. The temperature is raised to the boiling point of the chlorobenzene and kept there until no more methyl chloride is generated. The reaction mixture, cooled to room temperature, is then poured on to 1500 parts of ice and 280 parts of concentrated hydrochloric acid and the chlorobenzene is evaporated off with steam whereupon the difficultly soluble grey reaction product is obtained as a gritty mass which is filtered off and washed with water.

By heating with 30% caustic potash solution, the product so obtained is saponified to the dipotassium salt of 4.4'-diaminodiphenyl-3.3'-diglycolic acid which can be isolated with potassium chloride. A yield of 85–90% of the theoretical is obtained. It can be converted quantitatively by heating with excess aqueous hydrochloric acid into the known dilactam of 4.4'-diaminodiphenyl -3.3'-diglycolic acid of the formula:

M. P. over 300°.

The same product is obtained if instead of 1600 parts of chlorobenzene, 2000 parts of xylene, 1800 parts of nitrobenzene, 2000 parts of o-dichlorobenzene, 2000 parts of trichlorobenzene or 2000 parts of tetrachlorethane are used as indifferent solvent.

Example 7

397 parts of 4.4'-di-(chloroacetylamino)-3.3'-dimethoxydiphenyl are added in portions at 120° to a melt of 2000 parts of dehydrated aluminum chloride and 500 parts of sodium chloride upon which hydrogen chloride and methyl chloride are given off. When no more gas is generated, the melt is poured on to 5000 parts of ice and 5000 parts of water and 1500 parts of concentrated hydrochloric acid. The white reaction product which precipitates is filtered off and washed with water.

The known dilactam of 4.4'-diaminodiphenyl-3.3'-diglycolic acid is obtained in a yield of about 90% of the theoretical by saponification of the reaction product obtained with 30% caustic potash solution and heating of the isolated dipotassium salt of 4.4'-diaminodiphenyl-3.3'-diglycolic acid with excess aqueous hydrochloric acid. The dilactam melts at over 300°.

If instead of 397 parts of 4.4'-di-(chloracetylamino)-3.3'-dimethoxydiphenyl, 514 parts of 4.4'-di(bromacetylamino)-3.3'-diethoxydiphenyl are used or instead of 500 parts of sodium chloride 500 parts of potassium chloride or 180 parts of triethylamine are used as diluent, the same compound is obtained.

Example 8

392.5 parts of 4-oxalylamino-4'-(chloracetylamino)-3.3'-dimethoxydiphenyl (obtained by reacting 4-oxalylamino-4'-amino-3.3'-dimethoxydiphenyl with chloracetyl chloride in dioxan; yellow green crystals from glacial acetic acid M. P. 198° on decomposition) are added at 150° to a melt of 3600 parts of dehydrated aluminium chloride and 950 parts of sodium chloride whereby methyl chloride and hydrogen chloride are given off. When no more methyl chloride is generated, the melt is poured on to 18,000 parts of ice and 1000 parts of concentrated hydrochloric acid. The difficultly soluble reaction product is filtered off and washed with water.

The raw product so obtained is saponified, by heating with 15% caustic soda lye, to the sodium salt of 4.4'-diamino-3-hydroxydiphenyl-3'-glycolic acid which can be isolated with common salt. If the hot saponification solution is strongly acidified with concentrated hydrochloric acid, the lactam of the chlorohydrate of 4.4'-diamino-3-hydroxydiphenyl-3'-glycolic acid of the formula:

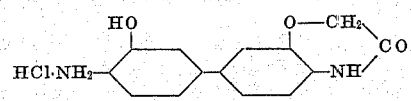

crystallises out on cooling. The yield is about 60% of the theoretical. The compound crystallises from diluted hydrochloric acid in white needles which on heating do not melt till 300°.

Calculated: C 57.42%, H 4.47%, N 9.61%, Cl 12.11%. Found: C 57.65%, H 4.66%, N 9.63%, Cl 12.07%.

Example 9

244 parts of 4.4'-diamino-3.3'-dimethoxydiphenyl are dissolved hot in 1800 parts of dry chlorobenzene, 410 parts of α-bromobutyric acid chloride are added to the solution at 100° and the whole is stirred at this temperature until no more hydrogen chloride is given off. On cooling to 20°, part of the 4.4'-di-(α-bromobutyrylamino)-3.3'-dimethoxydiphenyl precipitates as crystals. (M. P. 193° C.).

400 parts of pulverised dehydrated aluminium chloride are added soon after which methyl bromide and methyl chloride and hydrogen chloride are generated. The temperature is slowly raised to the chlorobenzene boiling point and kept there until no more gas is generated. The reaction mixture is then poured on to 1000 parts of ice, acidified with 200 parts of concentrated hydrochloric acid and the chlorobenzene is evaporated off with steam. The brown gritty reaction product which remains is filtered off and washed with water.

The compound crystallises from glacial acetic acid in pale yellow needles. M. P. 223° (while foaming). Elementary analysis shows that the product contains bromine; microanalysis gives a compound of the formula:

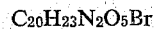

$C_{20}H_{23}N_2O_5Br$

Calculated: C 53.22%, H 5.14%, N 6.28%. Found: C 53.23%, H 5.02%, N 6.28%.

This compound can be taken as the addition compound of 1 mol of water and 1 mol of hydrogen bromide to 1 mol of the lactam of 4.4'-diaminodiphenyl-3.3'-di-(α.α'-diethyl)-glycolic acid of the formula:

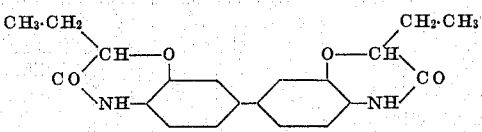

The addition compound is saponified with 30% caustic potash solution by heating for a long period to form the dipotassium salt of 4.4'-diaminodiphenyl-3.3'-di-(α.α'-diethyl)-glycolic acid of the formula:

If instead of 410 parts of α-bromobutyric acid chloride 560 parts of α-bromopropionic acid bromide are used and otherwise the same procedure is followed, the corresponding addition compound of the dilactam of 4.4'-diaminodiphenyl-3.3'-di-(α.α'-dimethyl)-glycolic acid is obtained. It can be saponified by heating with 30% caustic potash lye to the dipotassium salt of 4.4'-diaminodiphenyl-3.3'-di-(α.α'-dimethyl)-glycolic acid.

Example 10

173 parts of 1-amino-2-methoxynaphthalene are dissolved in 1500 parts of dry chlorobenzene at 100°, 120 parts of chloracetyl chloride are added to the solution and the whole is stirred at 100° until no more hydrogen chloride is generated. (M. P. of chloracetyl compound 185°).

265 parts of pulverised dehydrated aluminium chloride are added to the chlorobenzene solution at 20° whereupon the temperature of the mixture is slowly raised to 120° during which methyl chloride and hydrogen chloride are given off. When no more gas is generated, the reaction mixture is poured on to 700 parts of ice, acidified with 200 parts of concentrated hydrochloric acid and the chlorobenzene is evaporated off with steam. The difficultly soluble reaction product which remains is filtered off and washed with water. It is saponified to the sodium salt of 1-amino-2-naphthyl glycolic acid by heating with 15% caustic soda lye and the sodium salt is isolated with common salt. Yield is about 80% of the theoretical. By heating with excess aqueous hydrochloric acid, the lactam of 1-amino-2-naphthyl glycolic acid of the formula:

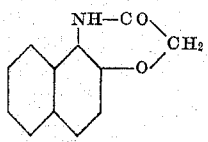

is obtained. It crystallises from diluted acetic acid in small light brown needles. M. P. 218–219°.

Calculated: C 72.35%, H 4.53%, N 7.04%. Found: C 72.24%, H 4.33%, N 6.80%.

If instead of 1500 parts of chlorobenzene, 1800 parts of xylene, 1600 parts of nitrobenzene, 1800 parts of o-dichlorobenzene, 1800 parts of trichlorobenzene or 1800 parts of tetrachlorethane are used, the same compound is obtained.

Example 11

187 parts of 1-amino-2-ethoxynaphthalene are dissolved at 100° in 1500 parts of dry chlorobenzene, 120 parts of chloracetyl chloride are added and the whole is stirred at 100° until no more hydrogen chloride is generated. (M. P. of chloracetyl compound 161°).

265 parts of pulverised dehydrated aluminium chloride are added to the chlorobenzene solution at 20° whereupon the temperature of the mixture is slowly raised to 120° during which ethyl chloride and hydrogen chloride are given off. When no more gas is generated, the reaction mixture is poured on to 700 parts of ice and 250 parts of concentrated hydrochloric acid and the chlorobenzene is evaporated off with steam. The difficultly soluble reaction product which remains is filtered off and washed with water. It is saponified to the sodium salt of 1-amino-2-naphthyl glycolic acid by heating with 15% caustic soda lye and the sodium salt is isolated with sodium chloride. Yield is about 80% of the theoretical. The product is identical with that obtained according to Example 10. On heating the sodium salt with excess aqueous hydrochloric acid the lactam of 1-amino-2-naphthyl glycolic acid described in Example 10 is obtained. M. P. 218–219°.

What we claim is:

1. A process for the manufacture of an alkali salt of an α-(o-aminoaryloxy)-aliphatic carboxylic acid, which comprises reacting (a) an o-alkoxyarylamide of a lower α-halogen aliphatic carboxylic acid, which lower α-halogen aliphatic carboxylic acid contains from two to four carbon atoms, and in which o-alkoxyarylamide the alkoxy group contains from one to two carbon atoms and the aryl group is selected from the class consisting of aryl groups of the benzene, diphenyl and naphthalene series, with (b) a Friedel-Crafts condensing agent at a raised temperature, whereby alkyl halide splits off, and saponifying the resultant intermediate product with a strong alkali, whereby the corresponding alkali salt of the α-(o-aminoaryloxy)-aliphatic carboxylic acid is produced.

2. A process for the manufacture of an alkali salt of an α-(o-aminoaryloxy)-aliphatic carboxylic acid, which comprises reacting (a) an o-alkoxyarylamide of a lower α-halogen aliphatic carboxylic acid, which lower α-halogen aliphatic carboxylic acid contains from two to four carbon atoms, and in which o-alkoxyarylamide the alkoxy group contains from one to two carbon atoms and the aryl group is selected from the class consisting of aryl groups of the benzene, diphenyl and naphthalene series, with (b) anhydrous aluminum chloride at a raised temperature, whereby alkyl halide splits off, and saponifying the resultant intermediate product with a strong alkali, whereby the corresponding alkali salt of the α-(o-aminoaryloxy)-aliphatic carboxylic acid is produced.

3. A process for the manufacture of an alkali salt of an α-(o-aminoaryloxy)aliphatic carboxylic acid, which comprises reacting (a) an o-alkoxyarylamide of a lower α-halogen aliphatic carboxylic acid, which lower α-halogen aliphatic carboxylic acid contains from two to four carbon atoms, and in which o-alkoxyarylamide the alkoxy group contains from one to two carbon atoms and the aryl group is selected from the class consisting of aryl groups of the benzene, diphenyl and naphthalene series, with (b) anhydrous aluminum chloride at a raised temperature in an indifferent organic solvent having a boiling point above 100° C., whereby alkyl halide splits off, and saponifying the resultant intermediate product with a strong alkali, whereby the corresponding alkali salt of the α-(o-aminoaryloxy)-aliphatic carboxylic acid is produced.

4. A process for the manufacture of an alkali salt of an α-(o-aminoaryloxy)-aliphatic carboxylic acid, which comprises reacting (a) an o-alkoxyarylamide of a lower α-halogen aliphatic carboxylic acid, which lower α-halogen aliphatic carboxylic acid contains from two to four carbon atoms, and in which o-alkoxyarylamide the alkoxy group contains from one to two carbon atoms and the aryl group is selected from the class consisting of aryl groups of the benzene, diphenyl and naphthalene series, with (b) aluminum chloride in a melt of aluminum chloride and an indifferent diluent at a raised temperature, whereby alkyl halide splits off, and saponifying the resultant intermediate product with a strong alkali, whereby the corresponding alkali salt of the α-(o-aminoaryloxy)-aliphatic carboxylic acid is produced.

5. A process for the manufacture of an alkali salt of an o-aminoaryloxy acetic acid, which comprises reacting a 4,4'-di-halogen acetylamino-3,3'-dialkoxydiphenyl with anhydrous aluminum chloride at over 80° C., and saponifying the resultant intermediate product with a strong alkali, whereby the corresponding alkali salt of 4,4'-diaminodiphenyl-3,3'-diglycolic acid is produced.

6. A process for the manufacture of an alkali salt of an o-aminoaryloxy acetic acid, which comprises reacting a 4,4'-dichloracetylamino-3,3'-dimethoxydiphenyl with anhydrous aluminum chloride at over 80° C., and saponifying the resultant intermediate product with a strong alkali, whereby the corresponding alkali salt of 4,4'-diaminodiphenyl-3,3'-diglycolic acid is produced.

7. A process for the manufacture of an alkali salt of an o-aminoaryloxy acetic acid, which comprises reacting a 1-halogen-acetylamino-2-alkoxynaphthalene with anhydrous aluminum chloride at over 80° C., and saponifying the resultant intermediate product with a strong alkali, whereby the corresponding alkali salt of 1-amino-2-naphthyl-glycolic acid is produced.

8. A process for the manufacture of an alkali salt of an o-aminoaryloxy acetic acid, which comprises reacting a 1-chloracetylamino-2-ethoxynaphthalene with anhydrous aluminum chloride at over 80° C., and saponifying the resultant intermediate product with a strong alkali, whereby the corresponding alkali salt of 1-amino-2-naphthylglycolic acid is produced.

References Cited in the file of this patent

Aschan: Ber. Deut. Chem., vol. 20, page 1524 (1887).
Thate: Beilstein (Handbuch, 4th ed.) vol. 27, page 190 (1937).
Thomas: "Aluminum Chloride in Org. Chem." ASC monograph No. 87, pages 731–732 (1941).